June 5, 1962   E. E. GILBERT ET AL   3,037,906
CHLOROBROMOCARBON AND METHOD FOR COMBATTING FUNGUS THEREWITH
Filed Sept. 26, 1958   2 Sheets-Sheet 1
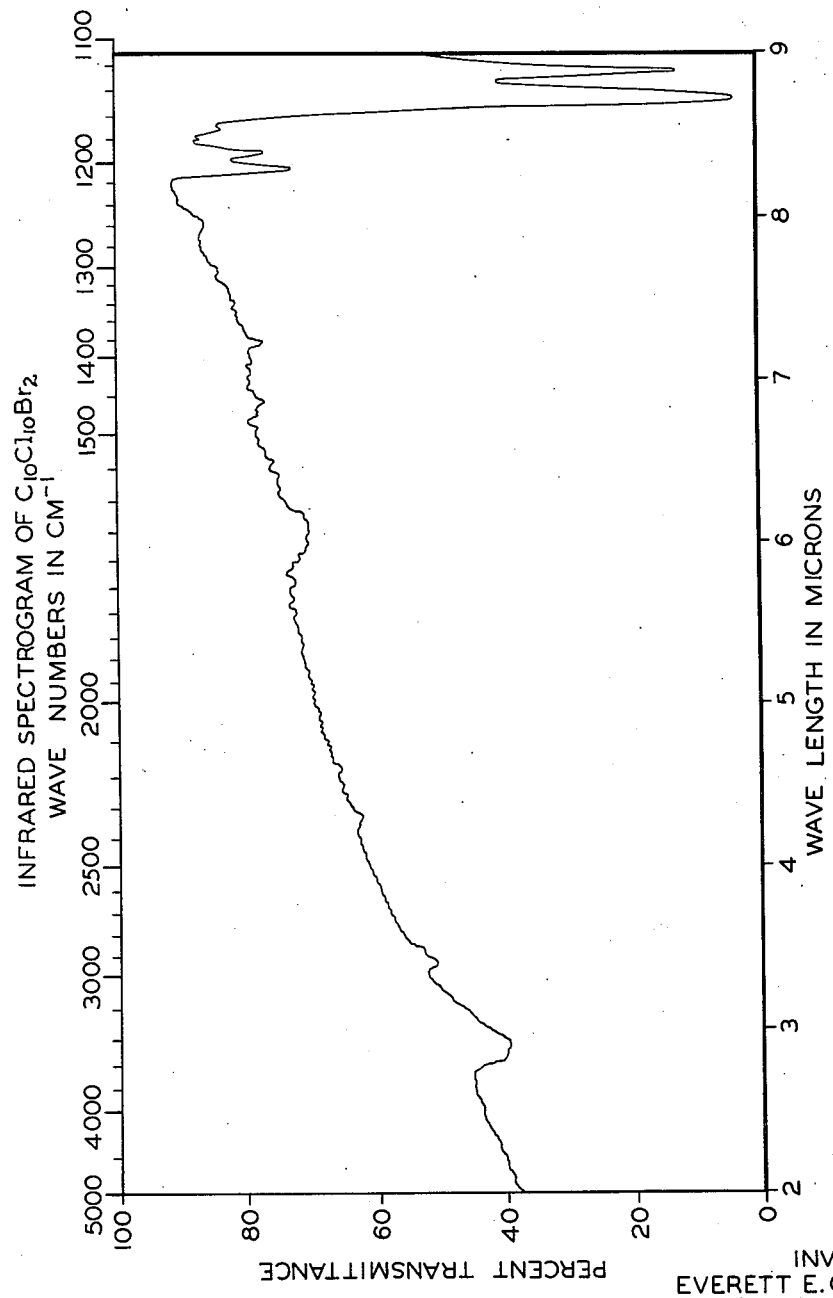
FIG.IA.
INVENTORS
EVERETT E. GILBERT
PASQUALE LOMBARDO
BY
Roger J. Drew
ATTORNEY

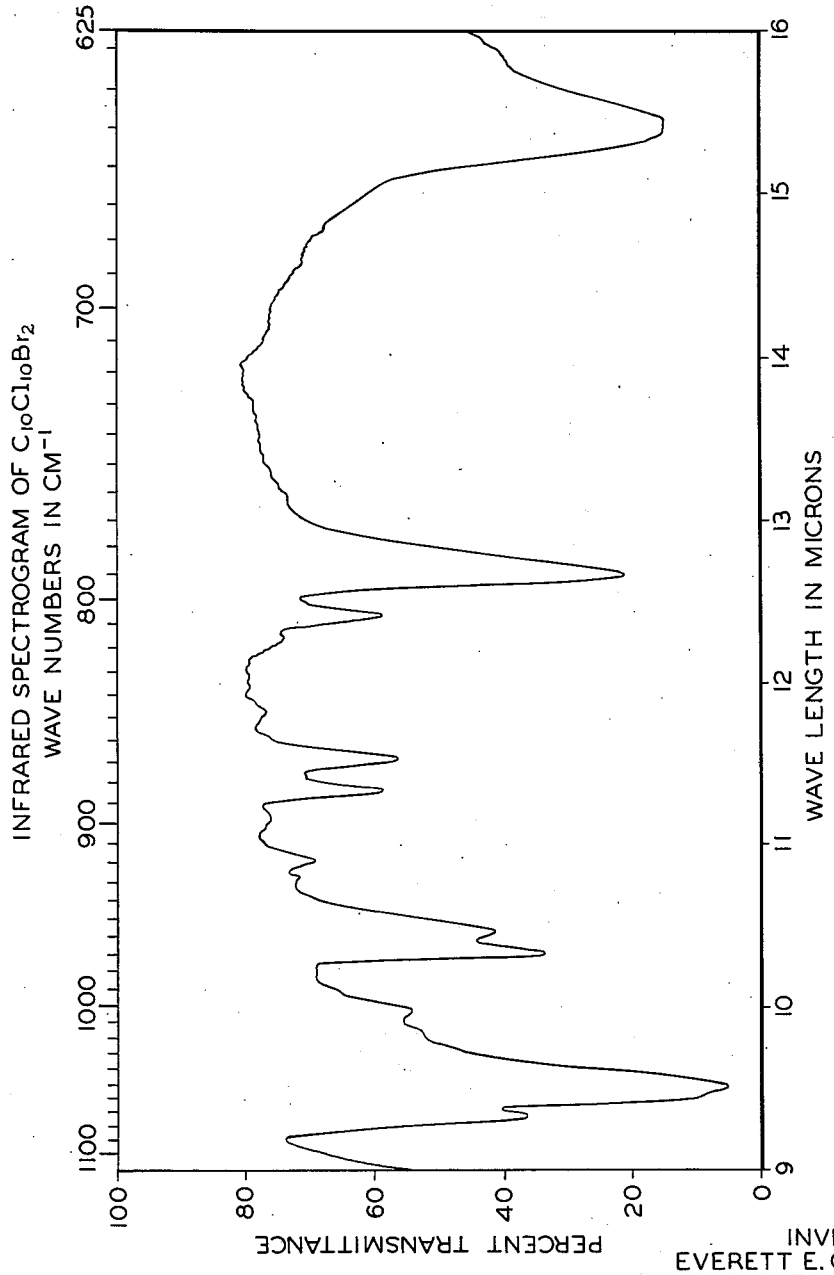

United States Patent Office 3,037,906
Patented June 5, 1962

3,037,906
CHLOROBROMOCARBON AND METHOD FOR COMBATTING FUNGUS THEREWITH
Everett E. Gilbert, Morristown, and Pasquale Lombardo, Newark, N.J., assignors to Allied Chemical Corporation, New York, N.Y., a corporation of New York
Filed Sept. 26, 1958, Ser. No. 763,680
7 Claims. (Cl. 167—30)

This invention relates to a novel chlorobromocarbon, a process for preparing the novel chlorobromocarbon, a fungicidal composition containing the chlorobromocarbon as an essential active ingredient, and to a method for combating fungus with such fungicidal composition.

The chlorobromocarbon of the instant invention has the empirical formula $C_{10}Cl_{10}Br_2$ and is characterized by being a white, odorless, crystalline solid melting at temperature of substantially 348° C.–353° C. (sealed tube) with darkening. It is soluble in benzene, diethyl ether and acetone, slightly soluble in hexane and ligroin, and insoluble in water. The chlorobromocarbon has the characteristic infrared spectrogram hereinafter described in detail, and has the following analysis as compared to theoretical for $C_{10}Cl_{10}Br_2$:

|        | Percent Theory ($C_{10}Cl_{10}Br_2$) | Percent Found | |
| --- | --- | --- | --- |
| C      | 18.9  | 18.5  | 18.7 |
| Cl     | 55.9  | 55.8  | 55.6 |
| Br     | 25.2  | 25.1  | 24.9 |
| H      | 0     | 0     | 0    |
| Mol. Wt. | 635 | 635   | 632  |

The compound was concluded to be $C_{10}Cl_{10}Br_2$ on the basis of the foregoing analysis and the infrared spectrogram hereinafter described.

It is an object of this invention to provide a novel chlorobromocarbon.

Another object is to provide a process for preparing the novel chlorobromocarbon.

A further object is to provide a fungicidal composition containing the novel chlorobromocarbon as an essential active ingredient.

A further object is to provide a method for combating fungus, especially plant fungus, with such fungicidal composition.

Other objects and advantages will be apparent as the invention is hereafter described in detail.

The starting material in the preparation of the new compound of this invention is the ketonic $C_{10}Cl_{10}O$ compound obtained by condensing two molecules of hexachlorocyclopentadiene with the aid of sulfur trioxide to form hexachlorocyclopentadiene-$SO_3$ reaction product, and hydrolyzing the reaction product to the ketone. Its preparation is more fully described in Gilbert et al. U.S. Reissue Patent 24,435 of February 25, 1958.

The $C_{10}Cl_{10}Br_2$ chlorobromocarbon can be prepared by heating the $C_{10}Cl_{10}O$ ketonic compound together with phosphorus tribromide, $PBr_3$, and bromine at temperature of broadly about 125°–200° C., preferably about 125°–150° C. to produce the chlorobromocarbon in accordance with the equation:

$$C_{10}Cl_{10}O + PBr_3 + Br_2 \rightarrow C_{10}Cl_{10}Br_2 + POBr_3$$

The following specific example further illustrates the invention, parts being by weight unless otherwise specified.

Fifty (50) parts of purified anhydrous ketonic compound having the empirical formula $C_{10}Cl_{10}O$ obtained as previously described was mixed in a pressure vessel with 130 parts of $PBr_3$ and 80 parts of bromine. The vessel was then sealed and heated at 125–150° C. for 3 hours. The vessel was then cooled, opened and its contents drowned in water to yield a solid precipitate. The precipitate was filtered, washed two times with methanol, then dissolved in benzene and the solution poured into 500 parts by volume of methanol to obtain a solid precipitate. The solid precipitate was filtered, washed two times with methanol and air dried to obtain tan crystals. 24 parts of the tan crystals were dissolved in 200 parts by volume of methylene chloride, the solution filtered and the filtered solution drowned in 500 parts by volume of methanol to yield a solid precipitate. The solid was filtered off and dissolved in 100 parts by volume of hot xylene, the resulting solution being treated with decolorizing charcoal followed by filtering. The filtered solution was evaporated by heating to 50 parts by volume, then cooled to effect crystallization, followed by filtering off the crystals, washing the crystals two times with methanol and air drying the washed crystals. A yield of 11.5 parts of white crystals of purified $C_{10}Cl_{10}Br_2$ chlorobromocarbon was obtained melting at 348°–353° C. (sealed tube) with darkening.

The infrared spectrogram of the $C_{10}Cl_{10}Br_2$ chlorobromocarbon was measured and recorded to enable identification of the same with certainty, employing a standard infrared recording spectrophotometer designed for measuring and recording the infrared transmission of solids, liquids, and gases. Such infrared spectrogram was measured when the chlorobromocarbon was combined with potassium bromide in the form of pellets. The pellets were prepared by first mixing 0.02 gram of the solid $C_{10}Cl_{10}Br_2$ chlorobromocarbon with 1 gram of solid potassium bromide followed by grinding to a particle size passing through a 100 mesh sieve. Thereafter the ground mixture was pelleted under pressure of 15,000 p.s.i.g. Such infrared spectrogram curve of the chlorobromocarbon is shown in accompanying FIGURES 1A and 1B of the drawings, the curve being continued or shown in both drawings for purposes of clarity in showing detail.

The infrared spectrogram of any chemical compound serves as an accurate means for identifying the compound, and it has been compared with a human fingerprint in its ability to identify a compound with certainty. As shown by the infrared spectrogram curve of the charts of the drawings which are graduated in percent transmission as ordinates, in wave length as abscissae, and also shows wave numbers or frequencies, the chlorobromocarbon when combined with potassium bromide in pellet form exhibits characteristic absorption maxima at the following frequencies expressed in reciprocal centimeters: 1205, 1190, 1145, 1125, 1053, 969, 958, 884, 864, 807, 790 and 650.

Presence of the bromine atoms in the $C_{10}Cl_{10}Br_2$ chlorobromocarbon molecule results in the compound having different chemical reactivity and properties as well as different physical properties than does the $C_{10}Cl_{12}$ chlorocarbon. For instance, the $C_{10}Cl_{10}Br_{12}$ chlorocarbon. For instance, the $C_{10}Cl_{10}Br_{12}$ chlorobromocarbon reacted with sulfur trioxide to yield the ketonic $C_{10}Cl_{10}O$ compound, identified as such by infrared spectrographic analysis. On the contrary, the $C_{10}Cl_{12}$ chlorocarbon did not react with sulfur trioxide. The $C_{10}Cl_{10}Br_2$ chlorobromocarbon reacted with zinc dust in the presence of glacial acetic acid with refluxing for one hour to give the compound identified by elemental analysis as $C_{10}Cl_{10}H_2$. Use of a relatively larger proportion of zinc in the reaction gave a product having an infrared spectrogram different from that of the $C_{10}Cl_{10}H_2$. On the contrary, the $C_{10}Cl_{12}$ chlorocarbon did not react with zinc dust either in presence or absence of glacial acetic acid. Further, the $C_{10}Cl_{10}Br_2$ chlorobromocarbon reacted with lithium aluminum hydride in diethyl ether with refluxing for about 5 hours. However, the $C_{10}Cl_{12}$ chlorocarbon showed no reaction with lithium aluminum hydride in diethyl ether with refluxing for the time stated. Further, the $C_{10}Cl_{10}Br_2$ chlorobromocarbon also reacted with sodium butoxide in the presence of xylene with refluxing for 24 hours at 120° C. to yield a reaction product which, after water washing and distilling in vacuo to remove xylene and butanol, was a dark, viscous oil. Infrared spectrographic analysis showed this material to be different than the starting $C_{10}Cl_{10}Br_2$, which is a high-melting solid. On the contrary, the $C_{10}Cl_{12}$ did not react with sodium butoxide in the presence of xylene at the reaction conditions stated. Additionally, the $C_{10}Cl_{10}Br_2$ chlorobromocarbon is highly fungicidal. However, the $C_{10}Cl_{12}$ chlorocarbon shows no appreciable fungacidal activity.

The novel $C_{10}Cl_{10}Br_2$ chlorobromocarbon is characterized by being a highly effective fungicide as aforesaid, especially for combating plant disease fungus. Living plants, e.g. stonefruit trees, e.g. peach, plum and cherry trees and clover plants are protected from fungus or fungi attack by its application without injury thereto.

The $C_{10}Cl_{10}Br_2$ chlorobromocarbon fungicidal ingredient can be applied to the material susceptible to fungus attack together with a fungicidal adjuvant as a carrier or diluent therefor in the form of spray and dust compositions. Further, the chlorobromocarbon can be so compounded as to produce fungicidal concentrates adapted subsequently to be used in the preparation of spray or dust mixtures. Spraying or dusting of the plants with the spray or dust fungicidal compositions is preferably to their foliage, stems and fruit (if present), but may also be to the roots and soil in which the plants are to be grown or are growing, and to the seeds before planting.

Spray compositions can be in the form of aqueous dispersions or emulsions, or solutions of the active chlorobromocarbon in organic liquid solvents, e.g. kerosene or other spray oils. Aqueous dispersions or emulsions have typical concentrations of from about 0.02% to 1% by weight of the chlorobromocarbon fungicidal ingredient. Solutions have typical weight concentrations of from about 0.5% to 20% of the novel chlorobromocarbon. Fungicidal concentrates can be in the form of water-dispersible powders adapted to be dispersed in water for spray application. Such powders typically contain in proportions by weight, from about 20% to 80% of the instant chlorobromocarbon fungicidal ingredient, from about 0.5% to 5% of wetting and dispersing agents and the balance powdered solid carrier or diluent, e.g. talc, wood flour, kaolin, sulfur and pumice. The dispersible powders are dispersed in water in typical amounts of ¼ lb. to 8 lbs. per 100 gallons of water.

Dust compositions comprise the chlorobromocarbon active fungicidal ingredient combined with solid powders or dust, such as, for example the powdered carrier materials previously set forth with regard water-dispersible fungicidal powders. Such compositions are adapted for application by dusting and typically contain from about 0.5% to 10% by weight of the chlorobromocarbon ingredient.

Sprayable aqueous dispersions can be prepared by mixing with water solutions of the chlorobromocarbon fungicidal ingredient and an emulsifying agent in a water-miscible organic solvent, e.g. acetone or a water-immiscible solvent, e.g. xylene. The solutions prior to dispersing typically contain, in proportions by weight, from about 20% to 80% of the chlorobromocarbon, from about 1% to 10% of emulsifying agent and the balance water-miscible or water-immiscible solvent.

Water-dispersible powders can be prepared by grinding or milling the solid chlorobromocarbon active ingredient together with the solid carrier and wetting and dispersing agents to a typical particle size from about 1 to 30 microns. Alternatively, the dispersible powder can be made by impregnation of the chlorobromocarbon on a mixture of the powdered carrier and wetting and dispersing agents as a melt or from solution.

Examples of wetting and dispersing agents which may be used herein include sodium lignosulfonate; "Nacconol NR," an alkyl aryl sodium sulfonate; and "Aerosol OT," a di(2-ethylhexyl)sulfosuccinate sodium salt. Suitable emulsifying agents include "Triton X–155," an alkyl aryl polyether alcohol, and blends of "Triton X–151" and "Triton 171," which are blends of alkyl aryl polyether alcohols with organic sulfonates.

The high degree of toxicity of the novel $C_{10}Cl_{10}Br_2$ chlorobromocarbon of this invention against various fungi will be appreciated by the following tests.

*Test 1.*—*Sclerotinia fructicola* (brown rot of stone fruit) spores were added to an aqueous acetone dispersion containing 1 part per million of the $C_{10}Cl_{10}Br_2$ chlorobromocarbon. A similar quantity of these spores were added to an aqueous copper sulfate solution containing 1 p.p.m. $Cu^{++}$ ion. The separate spore mixtures were incubated at 65° C. After an incubation period of 24 hours at 65° C. the mixture containing the chlorobromocarbon was examined under the microscope to determine percent germination of spores. No spore germination was noted in the mixture containing the chlorobromocarbon. A 98% spore germination was noted in the mixture containing copper sulfate.

*Test 2.*—*Stemphylium sarcinaeforme* (target spot of clover) spores were added to an aqueous acetone dispersion containing 1 part per million of the $C_{10}Cl_{10}Br_2$ chlorobromocarbon. Again a similar quantity of these spores were added to an aqueous copper sulfate solution containing 1 p.p.m. $Cu^{++}$ ion. After an incubation period of 24 hours at 65° C., microscopic examination showed no spore germination in the mixture containing the chlorobromocarbon. A 95% spore germination was noted in the mixture containing copper sulfate.

Although certain preferred embodiments of the invention have been disclosed for purpose of illustration it will be evident that various changes and modifications may be made therein without departing from the scope and spirit of the invention.

What is claimed is:

1. A chlorobromocarbon having the empirical formula $C_{10}Cl_{10}Br_2$ and characterized by being a white odorless crystalline solid having melting point of 348° C.–353° C. (sealed tube), being soluble in benzene, diethyl ether and acetone, slightly soluble in hexane and ligroin, insoluble in water, reacts with sulfur trioxide, reacts with zinc dust, reacts with lithium aluminum hydride, reacts with sodium butoxide, and exhibiting characteristic absorption maxima in the infrared region, when combined with potassium bromide in pellet form, at the following frequencies expressed in reciprocal centimeters: 1205, 1190, 1145, 1125, 1053, 969, 958, 884, 864, 807, 790 and 650.

2. A fungicidal composition containing as an essential toxic ingredient a chlorobromocarbon having the empirical formula $C_{10}Cl_{10}Br_2$ and characterized by being a white odorless crystalline solid having melting point of 348° C.–353° C. (sealed tube), being soluble in benzene, diethyl ether and acetone, slightly soluble in hexane and ligroin, insoluble in water, reacts with sulfur trioxide, reacts with zinc dust, reacts with lithium aluminum hydride, reacts with sodium butoxide, and exhibiting characteristic absorption maxima in the infrared region when combined with potassium bromide in pellet form at the following frequencies expressed in reciprocal centimeters: 1205, 1190, 1145, 1125, 1053, 969, 958, 884, 864, 807, 790 and 650 and a fungicidal adjuvant as a carrier therefor.

3. A method of combating plant fungus which comprises applying to the plant to be protected from plant fungus a fungicidal composition containing as an essential toxic ingredient a chlorobromocarbon having the empirical formula $C_{10}Cl_{10}Br_2$ and characterized by being a white odorless crystalline solid having melting point of 348° C.–353° C. (sealed tube), being soluble in benzene, diethyl ether and acetone, slightly soluble in hexane and ligroin, insoluble in water, reacts with sulfur trioxide, reacts with zinc dust, reacts with lithium aluminum hydride, reacts with sodium butoxide, and exhibiting characteristic absorption maxima in the infrared region, when combined with potassium bromide in pellet form, at the following frequencies expressed in reciprocal centimeters: 1205, 1190, 1145, 1125, 1053, 969, 958, 884, 864, 807, 790 and 650.

4. A method of protecting stonefruit trees against attack by brown rot of stonefruit which comprises applying to the tree to be protected a fungicidal composition containing as an essential toxic ingredient a chlorobromocarbon having the empirical formula $C_{10}Cl_{10}Br_2$ and characterized by being a white odorless crystalline solid having melting point of 348° C.–353° C. (sealed tube), being soluble in benzene, diethyl ether and acetone, slightly soluble in hexane and ligroin, insoluble in water, reacts with sulfur trioxide, reacts with zinc dust, reacts with lithium aluminum hydride, reacts with sodium butoxide, and exhibiting characteristic absorption maxima in the infrared region, when combined with potassium bromide in pellet form, at the following frequencies expressed in reciprocal centimers: 1205, 1190, 1145, 1125, 1053, 969, 958, 884, 864, 807, 790 and 650.

5. A method of protecting clover plants against attack by target spot of clover which comprises applying to the clover plant to be protected a fungicidal composition containing as an essential toxic ingredient a chlorobromocarbon having the empirical formula $C_{10}Cl_{10}Br_2$ and characterized by being a white odorless crystalline solid having melting point of 348° C.–353° C. (sealed tube), being soluble in benzene, diethyl ether and acetone, slightly soluble in hexane and ligroin, insoluble in water, reacts with sulfur trioxide, reacts with zinc dust, reacts with lithium aluminum hydride, reacts with sodium butoxide, and exhibting characteristic absorption maxima in the infrared region, when combined with potassium bromide in pellet form, at the following frequencies expressed in reciprocal centimeters: 1205, 1190, 1145, 1125, 1053, 969, 958, 884, 864, 807, 790 and 650.

6. A process of preparing a chlorobromocarbon having the formula $C_{10}Cl_{10}Br_2$, which comprises heating together a ketonic compound $C_{10}Cl_{10}O$ obtain by condensing two molecules of hexachlorocyclopentadiene in the presence of sulfur trioxide to form a hexachlorocyclopentadiene-$SO_3$ reaction product and hydrolyzing the reaction product, with phosphorus tribromide and bromine at temperature of about 125° C.–200° C. for a time sufficient to produce the $C_{10}Cl_{10}Br_2$ chlorobromocarbon, said ketonic compound $C_{10}Cl_{10}O$, phosphorus tribromide and bromine undergoing reaction in the proportion of at least one mol phosphorus tribromide and one mol bromine per mol of said $C_{10}Cl_{10}O$, and separating from the reaction mass the $C_{10}Cl_{10}Br_2$ chlorobromocarbon characterized by being a white odorless crystalline solid having melting point of 348° C.–353° C. (sealed tube), being soluble in benzene, diethyl ether and acetone, slightly soluble in hexane and ligroin, insoluble in water and exhibiting characteristic absorption maxima in the infrared region, when combined with potassium bromide in pellet form, at the following frequencies expressed in reciprocal centimeters: 1205, 1190, 1145, 1125, 1053, 969, 958, 884, 864, 807, 790 and 650.

7. A process of preparing a chlorobromocarbon having the formula $C_{10}Cl_{10}Br_2$, which comprises heating together a ketonic compound $C_{10}Cl_{10}O$ obtained by condensing two molecules of hexachlorocyclopentadiene in the presence of sulfur trioxide to form a hexachlorocyclopentadiene-$SO_3$ reaction product and hydrolyzing the reaction product, with phosphorus tribromide and bromine at temperature of about 125° C.–150° C. for a time sufficient to produce the $C_{10}Cl_{10}Br_2$ chlorobromocarbon, said ketonic compound $C_{10}Cl_{10}O$, phosphorus tribromide and bromine undergoing reaction in the proportion of at least one mol phosphorus tribromide and one mol bromine per mol of said $C_{10}Cl_{10}O$, and separating from the reaction mass the $C_{10}Cl_{10}Br_2$ chlorobromocarbon characterized by being a white odorless crystalline solid having melting point of 348° C.–353° C. (sealed tube), being soluble in benzene, diethyl ether and acetone, slightly soluble in hexane and ligroin, insoluble in water and exhibiting characteristic absorption maxima in the infrared region, when combined with potassium bromide in pellet form, at the following frequencies expressed in reciprocal centimeters: 1205, 1190, 1145, 1125, 1053, 969, 958, 884, 864, 807, 790 and 650.

References Cited in the file of this patent
UNITED STATES PATENTS

| | | |
|---|---|---|
| 2,220,981 | Horst | Nov. 12, 1940 |
| 2,724,730 | Johnson | Nov. 22, 1955 |
| 2,777,793 | Neumoyer | Jan. 15, 1956 |
| 2,801,269 | Baranauckas | July 30, 1957 |
| 2,849,499 | McBee | Aug. 26, 1958 |
| 2,908,723 | Rucker | Oct. 13, 1959 |

UNITED STATES PATENT OFFICE
CERTIFICATE OF CORRECTION

Patent No. 3,037,906                                                June 5, 1962

Everett E. Gilbert et al.

It is hereby certified that error appears in the above numbered patent requiring correction and that the said Letters Patent should read as corrected below.

Column 2, line 6, for "metahnol" read -- methanol --; lines 55 and 56, strike out "For instance, the $C_{10}Cl_{10}Br_{12}$ chlorocarbon."; line 56, for "$C_{10}Cl_{10}Br_{12}$" read -- $C_{10}Cl_{10}Br_2$ --; column 5, line 46, for "obtain" read -- obtained --.

Signed and sealed this 11th day of September 1962.

(SEAL)
Attest:

ERNEST W. SWIDER                                        DAVID L. LADD
Attesting Officer                                       Commissioner of Patents